US007997734B2

(12) United States Patent
Mochizuki et al.

(10) Patent No.: US 7,997,734 B2
(45) Date of Patent: Aug. 16, 2011

(54) IMAGE DISPLAY CONTROLLER FOR DISPLAY SHELF

(75) Inventors: Hiroki Mochizuki, Shizuoka (JP); Yoshihiko Ikeda, Shizuoka (JP); Yun Wang, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/002,736

(22) Filed: Dec. 18, 2007

(65) Prior Publication Data

US 2008/0151197 A1 Jun. 26, 2008

(30) Foreign Application Priority Data

Dec. 21, 2006 (JP) ................................. 2006-344003
Nov. 5, 2007 (JP) ................................. 2007-287877

(51) Int. Cl.

| | |
|---|---|
| ***G03B 21/26*** | (2006.01) |
| ***G03B 21/22*** | (2006.01) |
| ***G03B 21/28*** | (2006.01) |
| ***G05B 19/00*** | (2006.01) |
| ***G05B 23/00*** | (2006.01) |
| ***G06F 7/00*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl. ............................ 353/28; 353/78; 340/5.91

(58) Field of Classification Search .................... 353/28, 353/74, 77, 78; 359/449; 340/5.91
See application file for complete search history.

(56) References Cited

U.S. PATENT DOCUMENTS 6,301,417 B1 * 10/2001 Biscardi et al. ............... 385/120
6,870,670 B2 3/2005 Gehring et al.
7,427,014 B2 9/2008 Kimura et al.
7,762,671 B2 * 7/2010 Saito .............................. 353/42
(Continued)

FOREIGN PATENT DOCUMENTS

CN 1535399 A 10/2004
(Continued)

OTHER PUBLICATIONS

Japanese Office Action dated Oct. 20, 2008 and English translation thereof issued in a counterpart Japanese Application.
Extended European Search Report dated Nov. 18, 2008 issued in counterpart European Application.

(Continued)

*Primary Examiner* — William C Dowling
*Assistant Examiner* — Ryan Howard
(74) *Attorney, Agent, or Firm* — Patterson & Sheridan, LLP

(57) ABSTRACT

An image display controller for a display shelf generates image data for a projector image which is projected by a projector arranged in the display shelf to be displayed on a transmission-type screen of the display shelf. The image display controller includes a monitor, an input device, a data communicator, a memory, and a controller. The controller obtains an editing background image from the memory and displays the editing background image on the monitor, and generates contents of a display image. Moreover, the controller sets a position of the generated display image in a desired position of a display area of the editing background image in response to an instruction inputted via the input device, and generates the projector image by combining the generated display image into the editing background image at the set position.

5 Claims, 11 Drawing Sheets

U.S. PATENT DOCUMENTS

| | | | |
|---|---|---|---|
| 2006/0175415 | A1 | 8/2006 | Kimura et al. |
| 2007/0229767 | A1 | 10/2007 | Ikeda et al. |

FOREIGN PATENT DOCUMENTS

| | | | |
|---|---|---|---|
| DE | 20 2004 003 242 | U1 | 6/2004 |
| EP | 1 839 536 | A2 | 10/2007 |
| JP | 06-028366 | A | 2/1994 |
| JP | 07-017608 | A | 1/1995 |
| JP | 07-231838 | A | 9/1995 |
| JP | 07-334581 | A | 12/1995 |
| JP | 8-339168 | A | 12/1996 |
| JP | 2001-245756 | A | 9/2001 |
| JP | 2004-533636 | A | 11/2004 |
| JP | 2005-099888 | A | 4/2005 |
| JP | 2006-218030 | A | 8/2006 |
| WO | WO 02/082178 | A2 | 10/2002 |

OTHER PUBLICATIONS

U.S. Appl. No. 11/899,374, filed Sep. 5, 2007; Inventors: Yoshihiko Ikeda et al; Title: Display Shelf.

U.S. Appl. No. 12/070,696, filed Feb. 20, 2008; Inventors: Yoshihiko Ikeda et al; Title: Display Shelf and Display Shelf System.

Japanese Office Action dated Mar. 31, 2009 (2 pages), and English translation thereof (2 pages), issued in counterpart Japanese Application Serial No. 2007-287877.

Chinese Office Action dated Oct. 23, 2009 and partial English translation thereof issued in counterpart Chinese Application No. 2007101691967.

A display shelf for display, Nikkei industrial newspaper, compact edition, Japan, Nikkei Inc., Sep. 29, 2006, the front page.

Japanese Office Action dated Jan. 7, 2009, and English translation thereof with Declaration issued in counterpart Japanese Application No. 2007-287877.

* cited by examiner

IMAGE DISPLAY CONTROLLER FOR DISPLAY SHELF

The present application is based on and claims the benefit of priority of Japanese Patent Applications 2006-344003 filed on Dec. 21, 2006, and 2007-287877 filed on Nov. 5, 3007, the entire contents of which are incorporated herein by reference.

BACKGROUND OF THE INVENTION

1. Field of the Invention

The present invention relates to an image display controller for a display shelf, and particularly, to an image display controller which is capable of easily generating and editing image data of a display image, wherein the display image includes article information, such as a POP (Point of Purchasing) advertisement, and the display image is projected by a projector to a transmission-type screen, which is arranged with a placing table of the display shelf, from behind the transmission-type screen.

2. Discussion of Related Art

A display shelf is used widely in retail shops, such as supermarkets, convenience stores, and department stores.

In such retail shops, an article is displayed on the display shelf, and an inventory tag corresponding to the article is set in the display shelf. The purpose of the inventory tag is to give information about a price of the article, and so on, to customers.

In recent years, an electronic inventory tag has been developed (see Japanese Laid-Open Publication No. 2005-099888). The electronic inventory tag uses, for example, a liquid crystal panel, or an organic EL panel (see Paragraph [0008] of Japanese Laid-Open Publication No. 2005-099888, for example).

Principal applications of a display shelf in retail shops are to display an article, and to provide information about the article ("article information") displayed on the display shelf, such as a price, and so on, to customers by using an inventory tag or an electronic inventory tag. Moreover, POP advertisements have been widely adopted as a method for drawing customers' attention to the article displayed on the display shelf, and for inducing the customers to buy more articles.

Japanese Laid-Open Publication No. 2001-245756 discloses a showcase which includes a projector and a screen for displaying an image from the projector on a ceiling of the showcase. By adopting this technique, it is unnecessary to put an inventory tag including a POP advertisement printed on a recording medium, such as paper, on the display shelf. It is also possible to enhance a display effect of the article placed on the display shelf by projecting a projector image on the screen (see Paragraph [0018] of Japanese Laid-Open Publication No. 2001-245756).

Japanese Laid-Open Publication No. 2005-099888 discloses a landscape-oriented electronic inventory tag which is formed by connecting a plurality of thin-model display devices laterally so as obtain a larger area for displaying the article information (see FIG. 8 of the Japanese Laid-Open Publication No. 2005-099888). However, in this case, joints are formed between the thin-model display devices. Therefore, it is difficult to display a natural and beautiful image near the joint area of the screen.

Also, because it is difficult to provide an electronic inventory tag having a wide area for displaying the article information, the article information displayed by a conventional electronic inventory tag is limited to a small amount of information, such as a price corresponding to an article, and so on.

Therefore, it is difficult for the electronic inventory tag to have a function of displaying a POP advertisement.

A conventional display shelf usually includes a plurality of placing tables for placing articles. As disclosed in Japanese Laid-Open Publication No. 2001-245756, when the projector and the screen for displaying the projector image from the projector are located on a ceiling of the display shelf, there are distances between each placing table and the screen. Thus, when inventory tags corresponding to the articles placed on each placing table are displayed on the screen located on the ceiling, it is difficult to understand correspondence relationships between the articles and the inventory tags.

SUMMARY OF THE INVENTION

According to one aspect of the present invention, an image display controller of the present invention includes a monitor for displaying information, an input device for inputting information, and a data communicator for communicating with a projector arranged in a display shelf.

The display shelf includes (i) a placing table adapted to have an article placed thereon, (ii) a transmission-type screen for displaying a projector image which is projected by the projector onto a rear surface of the transmission-type screen, wherein the transmission-type screen is arranged with the placing table, and (iii) a projector placing portion for supporting the projector at a position from which the projector projects the projector image to the transmission-type screen from behind the transmission-type screen.

Moreover, the image display controller of the present invention includes a memory for storing an editing background image in which a display area for a display image to be displayed on the transmission-type screen is set such that the display area corresponds to the transmission-type screen, and a controller.

The controller (i) obtains the editing background image from the memory, and displays the editing background image on the monitor, (ii) generates the display image, (iii) sets a position of the generated display image to a position of the display area in the editing background image designated by an instruction inputted via the input device, and (iv) generates the projector image by combining the generated contents of the display image into the editing background image at the set position.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION

Embodiments of an image display controller for a display shelf according to the present invention are described below. The embodiments of the present invention described below relate to a display shelf which is preferably used in a supermarket.

Figure 1:
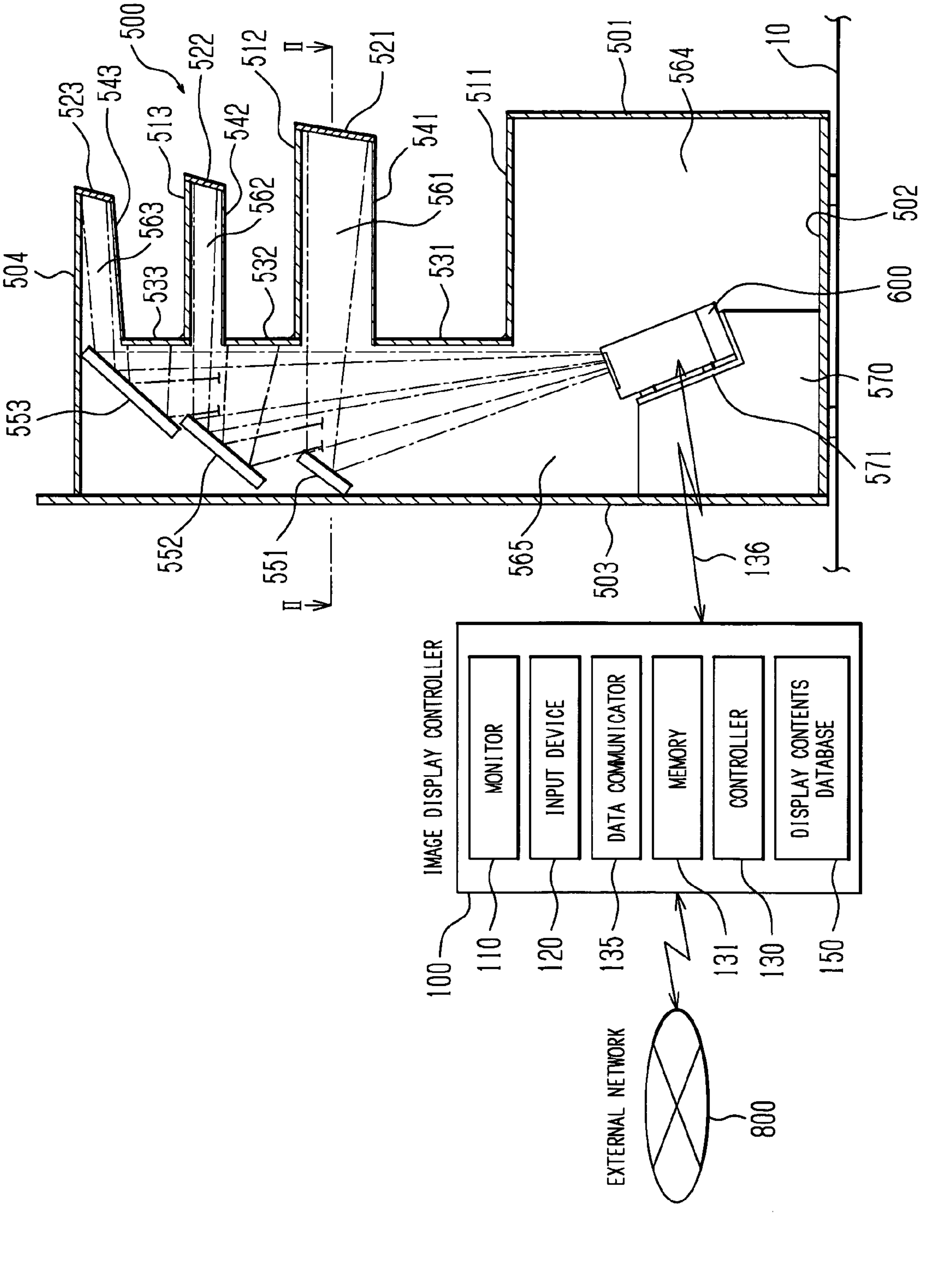
FIG. 1 is a schematic cross-sectional view of a display shelf according to an embodiment of the present invention.

As shown in FIG. 1, a display shelf 500 houses a projector 600 and is connected to an image display controller 100, which is located away from the display shelf 500, for example, in a stock room or another area away from the sales floor. The image display controller 100 is a computer, for example, and generates image data of a projector image, which includes a display image. The image display controller 100 is capable of communicating with the projector 600 wirelessly, for example, via a wireless network connection 136, and the generated image data of the projector image is sent to the projector 600 for the display shelf 500 via a data communicator 135 (e.g., for wireless network communication) of the image display controller 100. The projector 600 includes a wireless receiver to receive the transmitted image data, and a memory to store the received image data. If there are many display shelves in a store, one image display controller 100 may generate a respective image for each display shelf, and send the corresponding image to each projector for each display shelf via the data communicator 135, such that each projector projects a corresponding image appropriate for the specific display shelf.

Figure 2:
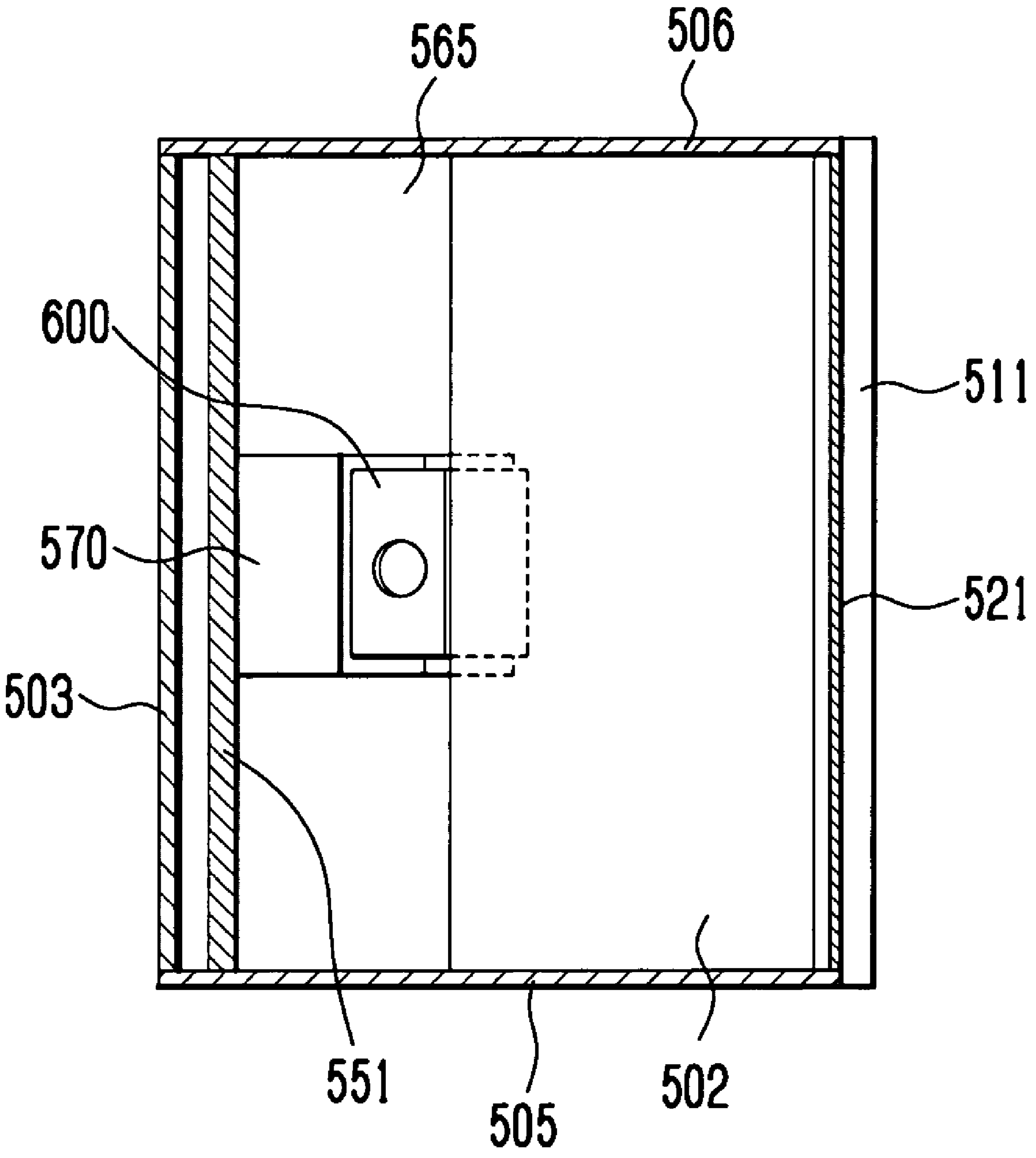
FIG. 2 is a cross-section along line II-II in FIG. 1.

The display shelf 500 is located on a floor 10, and includes a bottom front panel 501, a bottom panel 502, a back panel 503, a top panel 504, and a pair of side panels 505 and 506. The bottom front panel 501, the bottom panel 502, the back panel 503, and the top panel 504 are supported by the pair of side panels 505 and 506 (see FIG. 1 and FIG. 2). The display shelf 500 includes three shelf panels 511, 512, and 513. The three shelf panels 511, 512, and 513 form a three-layered placing table. That is, the shelf panel 511 forms a bottom placing table, the shelf panel 512 forms a middle placing table, and the shelf panel 513 forms an upper placing table. These three shelf panels are capable of displaying an article placed thereon. The three shelf panels 511, 512, 513 are supported by the pair of side panels 505 and 506 so as to be parallel to each other.

The display shelf 500 also includes five screens 521, 522, 523, 532, and 533 corresponding to the placing tables. The screen 521 is located at the upper side of the shelf panel 511; the screen 522 is located at the upper side of the shelf panel 512; and the screen 523 is located at the upper side of the shelf panel 513. Further, the screen 532 is located at the back of the shelf panel 512, and the screen 533 is located at the back of the shelf panel 513. Each of the screens 521, 522, 523, 532, and 533 is, for example, a milky white acrylic plate. Thus, an image that is projected on the back of each screen by the projector 600 can be seen at front surface of each screen. That is, the screens 521, 522, 523, 532, and 533 are transmission-type screens. The screen 521 extends vertically downward from a front end of the shelf panel 512, and is arranged to be at a predetermined angle (not perpendicular) to the horizontal direction (at a predetermined angle (not perpendicular) to the shelf panel 512). The screen 522 extends vertically downward from a front end of the shelf panel 513, and is arranged to be at a predetermined angle (not perpendicular) to the horizontal direction (at a predetermined angle (not perpendicular) to the shelf panel 513). The screen 523 extends vertically downward from a front end of the top panel 504, and is arranged to be at a predetermined angle (not perpendicular) to the horizontal direction (at a predetermined angle (not perpendicular) to the top panel 504). The screen 521 is fixed to the front end of the shelf panel 512, and to the pair of side panels 505 and 506. The screen 522 is fixed to the front end of the shelf panel 513, and to the pair of side panels 505 and 506. And the screen 523 is fixed to the front end of the top panel 504, and to the pair of side panels 505 and 506. Moreover, the screen 532 is arranged at the back of the shelf panel 512 so as to be perpendicular to the shelf panel 512, and the screen 533 is arranged at the back of the shelf panel 513 so as to be perpendicular to the shelf panel 513. A parting panel 531 which defines a depth of the bottom placing table is located at a back end part of the shelf panel 511.

A ceiling panel 541, which forms a ceiling part of the bottom placing table, extends from the top of the parting panel 531 so as to be parallel to the shelf panel 511. A ceiling panel 542, which forms a ceiling part of middle placing table, extends from the top of the screen 532 so as to be parallel to the shelf panel 512. A ceiling panel 543, which forms a ceiling part of the upper placing table, extends from the top part of the screen 533 so as to be at a predetermined angle (not parallel) to the shelf panel 513, so as not to block the image which is projected to the screen 523. The lower end part of the screen 521 is fixed to a front upper end part of the ceiling panel 541. The lower end part of the screen 522 is fixed to a front upper end part of the ceiling panel 542. And the lower end part of the screen 523 is fixed to a front upper end part of the ceiling panel 543.

A back surface of the screen 521, an upper surface of the ceiling panel 541, a bottom surface of the shelf panel 512, and inner surfaces of the pair of side panels 505 and 506 form an inner periphery which defines a horizontal space 561 for leading an image projected from the back side of the screen 521 to the back surface of the screen 521 without blocking the image. Likewise, a horizontal space 562 is defined by the screen 522, the ceiling panel 542, the shelf panel 513, and the pair of side panels 505 and 506, and further, a horizontal space 563 is defined by the screen 523, the ceiling panel 543, the top panel 504, and the pair of side panels 505 and 506. Since the ceiling panels 541, 542 and 543 are located below the horizontal spaces 561, 562 and 563, respectively, it is possible to prevent articles displayed on the shelf panels 511, 512, and 513 from entering into the horizontal spaces 561, 562, and 563, and it is possible to prevent the articles from making a shadow(s) in the images.

An inner surface of the bottom front panel 501, an upper surface of the bottom panel 502, an inner surface of the back panel 503, and inner surfaces of the pair of side panels 505 and 506 form an inner periphery which defines a projector placing space 564 where the projector 600 is located. Inner surfaces of the parting panel 531, the screens 532 and 533, an inner surface of the back panel 503, and inner surfaces of the pair of side panels 505 and 506 form an inner periphery which defines a vertical space 565 for leading the projector image from the projector 600 vertically.

The projector 600 is located in the projector placing space 564 on a projector placing table 570 which is located on the bottom panel 502. The projector placing table 570 has a predetermined placing portion 571, which positions the projector 600 such that an optical axis of the projector 600 inclines at a predetermined angle with respect to the vertical. By inclining the projector 600, it is possible to reduce the size of the projector placing space 564 of the projector 600.

Three plane mirrors 551, 552, and 553 serving as reflecting mirrors are located in the vertical space 565. The plane mirrors 551, 552, and 553 divide and reflect the projector image which is projected from the projector 600, and project portions of the projector image to the screens 521, 522, 523, 532, and 533. Both ends of each of the plane mirrors 551, 552, and 553 are fixed to the pair of side panels 505 and 506 (see FIG. 1 and FIG. 2).

The positional relationship between the projector 600, the plane mirrors 551, 552, and 553, and the screens 521, 522, 523, 532 and 533 is described in more detail below.

Figure 3:
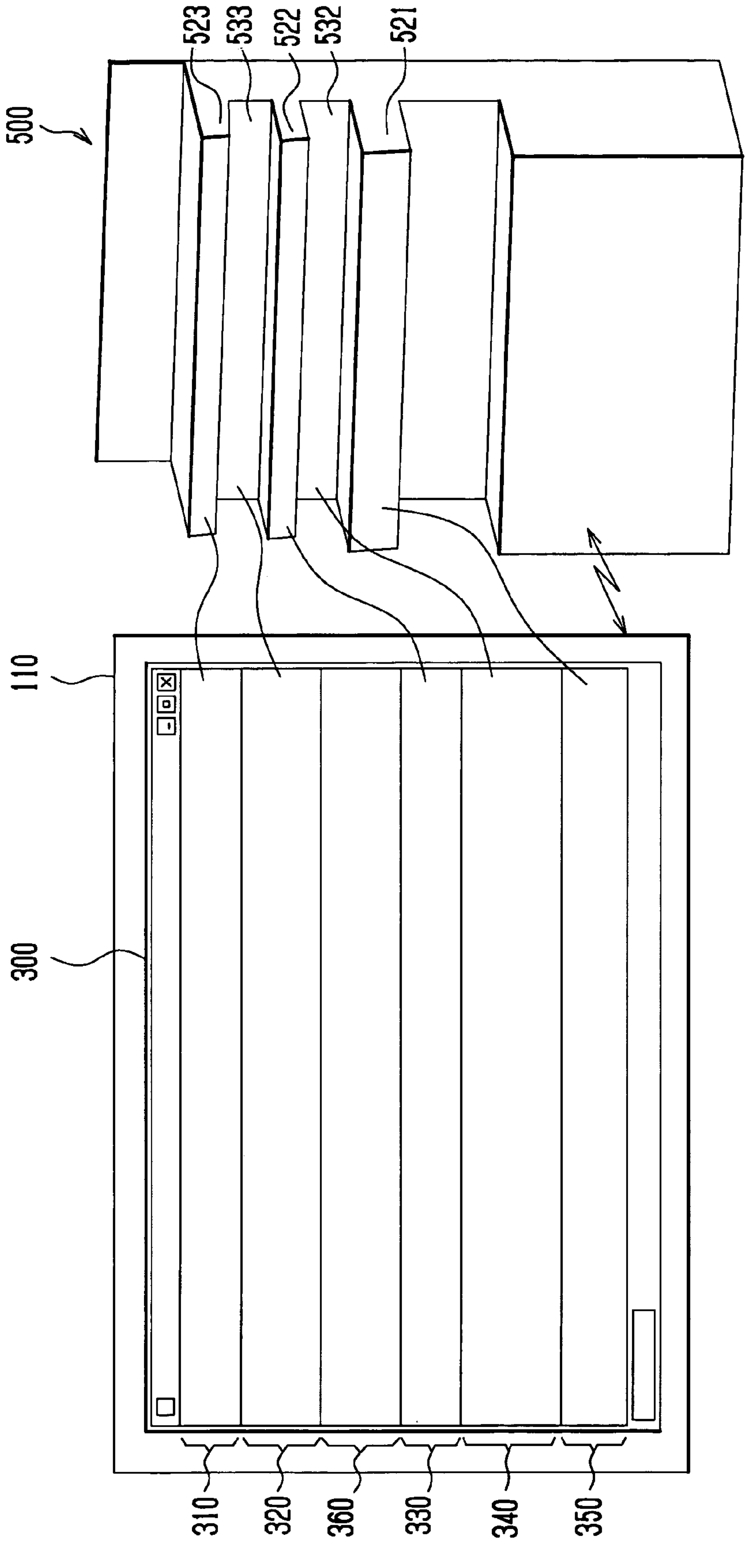
FIG. 3 is an exemplary diagram showing a correspondence relationship between a display area set in an editing background image which is stored in a memory of an image display controller for the display shelf according to an embodiment of the present invention, and a screen of the display shelf.

One projector is located in the display shelf 500. The projector 600 includes a liquid crystal display device, which displays the projector image that is generated by the image display controller 100. As shown in FIG. 3, the generated projector image includes an editing background image 300 having display areas 310, 320, 330, 340, and 350 and display images displayed in the display areas. In the present embodiment, as shown in FIG. 3, display areas 310, 320, 360, 330, 340, and 350 correspond respectively to the screens 523, 533, 522, 532, and 521. The display area 360 does not correspond to a screen in this embodiment. Each of the display areas has the same outline shape, namely a belt-like shape, as the corresponding screen, when the projector image including the display areas is projected to the backs of the screens by the projector. Moreover, the display areas are positioned in the projector image such that when the projector image including the display areas is projected to the backs of the screens by the projector, the display areas are aligned with the corresponding screens.

The projector 600 projects the projector image from the liquid crystal display to the plane mirrors 551, 552, and 553. The plane mirrors 551, 552, and 553 divide and reflect portions of the projector image projected from the projector 600, such that the portions of the projector image are projected on the backs of the screens 523, 533, 522, 532 and 521, respectively. The portions of the projector image protected to the screens 523, 522 and 521 are reflected by the plane mirrors 551, 552 and 553 through the corresponding horizontal spaces 561, 562, and 563.

That is, the plane mirror 551 is arranged so as to reflect a portion of the projector image projected from the projector 600, namely the display area 350, so as to project the display area 350 to the screen 521. The plane mirror 552 is arranged so as to divide and reflect another portion of the projector image, namely the display areas 330 and 340, so as to project the display area 330 to the screen 522 and so as to project the display area 340 to the screen 532. The plane mirror 553 is arranged so as to divide and reflect another portion of the projector image, namely the display areas 310 and 320, so as to project the display area 310 to the screen 523 and so as to project the display area 320 to the screen 533. The projector 600 is positioned such that the divided portions of the projector image from the liquid crystal display device of the projector 600 focus on the screens 521, 522 and 523. Although the divided portions of the projector image do not focus precisely on the screens 532 and 533, it is possible to display the divided portions of the projector image as viewable images if the screens 532 and 533 are arranged within the range of the focal depth of the projector 600.

Figure 4:
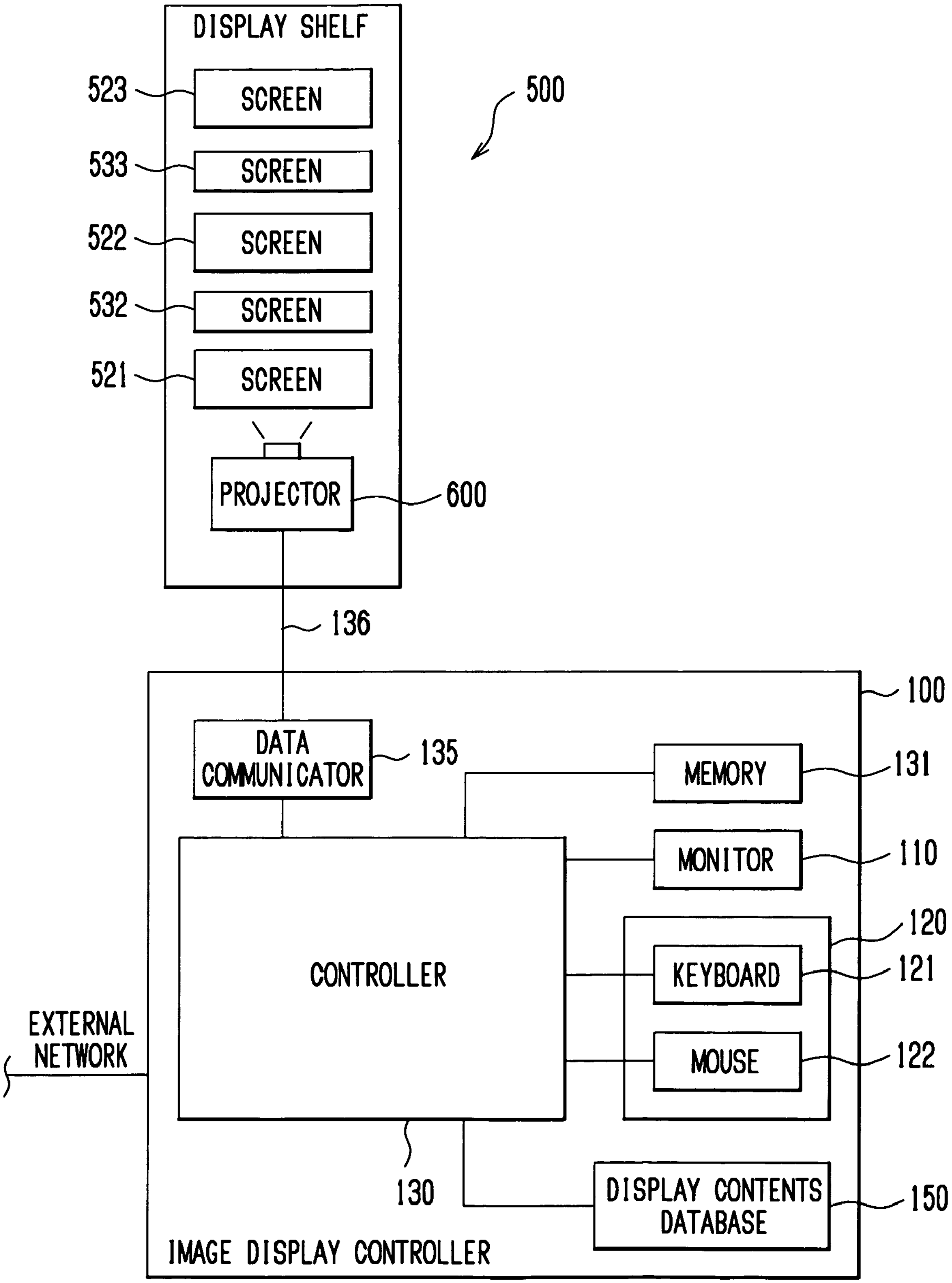
FIG. 4 is a block diagram showing a structure of the image display controller for the display shelf according to an embodiment of the present invention.

Next, the image display controller 100 will be described. As shown in FIGS. 1 and 4, the image display controller 100 includes a monitor 110, which includes a display such as a liquid crystal display; an input device 120, which includes, for example, a keyboard 121 and a pointing device 122 such as a mouse; a data communicator 135, which is used to, for example, communicate wirelessly with the projector 600; a memory 131; a controller 130; and a display contents database 150. The image display controller 100 is connected to an external network 800.

Figure 7:
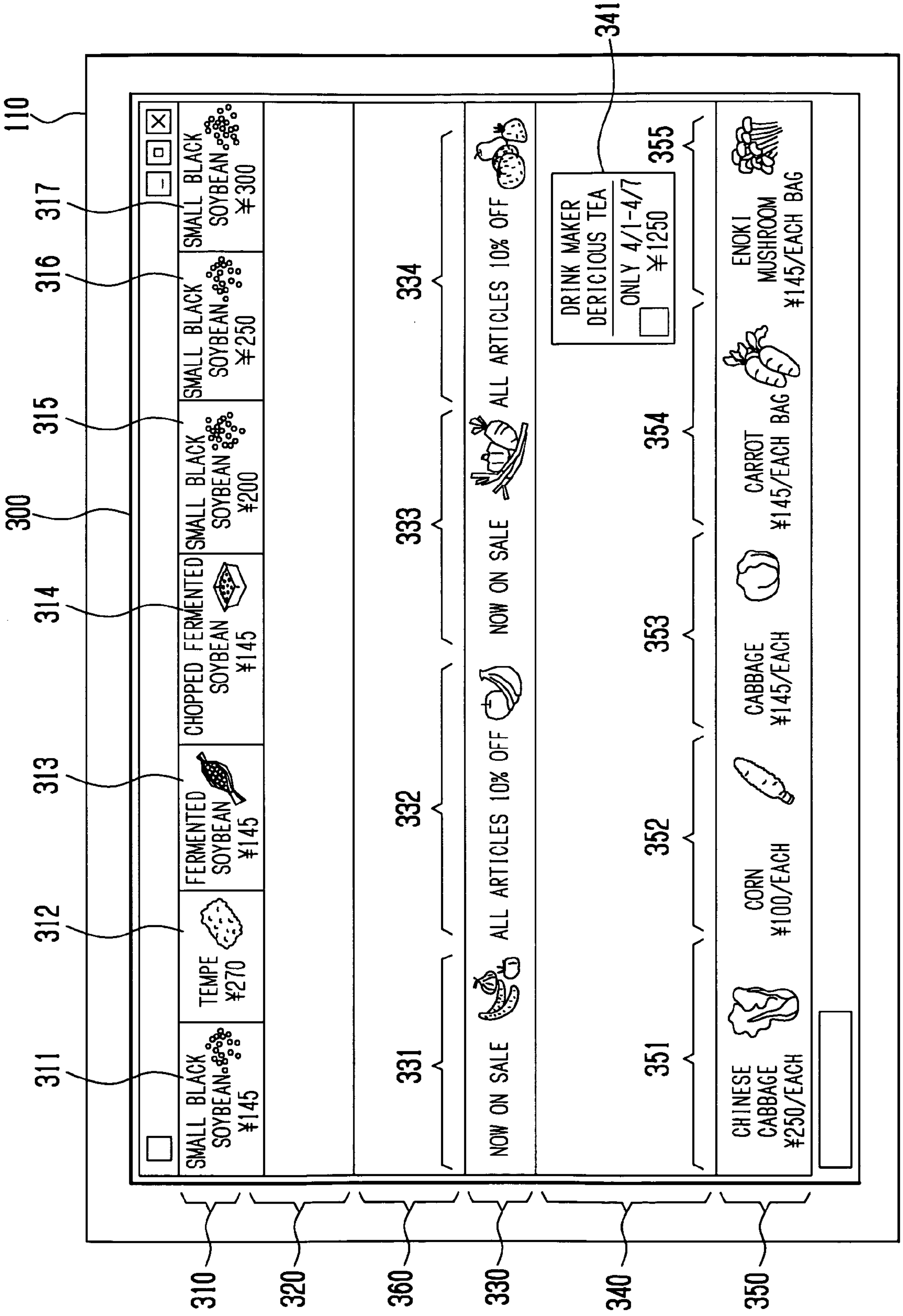
FIG. 7 is an exemplary diagram showing a state of generating the image data of a display image which is generated by the image display controller for the display shelf according to an embodiment of the present invention.

With this structure, the image display controller 100 is capable of generating the image data of the projector image. More specifically, to generate the projector image, as shown in FIG. 7, the monitor 110 is controlled by the controller 130 to display the editing background image 300 and the display images. Moreover, the input device 120 is operated to input data, such as an image and a number and/or other text, to change or manipulate the display images.

The memory 131 stores the image data of the editing background image 300. The belt-like display areas corresponding to each screen of the display shelf 500 are previously set in the editing background image 300. That is, the belt-like display area 310 corresponding to the screen 523, the belt-like display area 320 corresponding to the screen 533, the belt-like display area 330 corresponding to the screen 522, the belt-like display area 340 corresponding to the screen 532, and the belt-like display area 350 corresponding to the screen 521 are previously set in the editing background image 300.

In this embodiment, the editing background image 300 is a previously-used image. That is, when the projector image is being changed, the previous projector image is used as the editing background image. Thus, the display images which include the article information have already been set in plurality of belt-like display areas in the previous editing background image.

Figure 5:
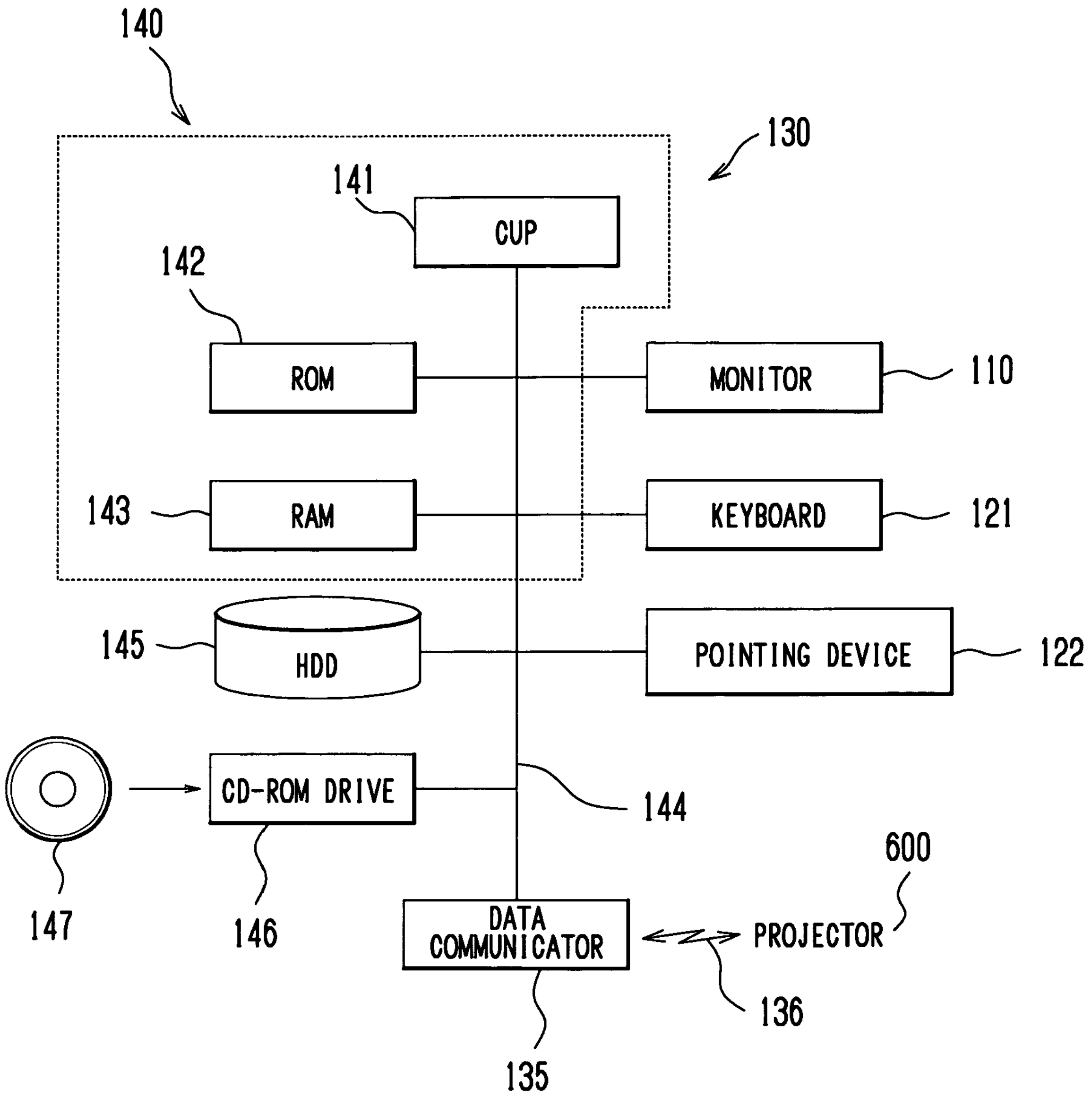
FIG. 5 is a block diagram of a hardware structure of a controller of the image display controller.

The controller 130 of the image display controller 100 is a computer, which executes various processes to control the image display controller 100. As shown in FIG. 5, the controller 130 includes a computer 140 as an information processor. The computer 140 includes a CPU 141, a ROM 142, a RAM 143, and a bus line 144. The ROM 142 and the RAM 143 are connected to the CPU 141 via the bus line 144. The CPU 141 executes various arithmetic processings. The ROM 142 stores fixed data such as a BIOS. The RAM 143 rewritably stores various data, and is used for a work area. A HDD (Hard Disk Drive) 145 and a CD-ROM drive 146 are connected to the computer 140. As an example, the computer 140 is formed such that, the CD-ROM drive 146 reads the data code of an OS (Operating System, FIG. 6) and application programs from a CD-ROM 147 which stores the OS and various application programs, and installs the OS and various application programs in the HDD 145. The monitor 110 the keyboard 121, and the mouse, which is the pointing device 122, are connected to the computer 140 (to the controller 130). The data communicator 135 is also connected to the computer 140 (to the controller 130). The data communicator 135 supports a protocol which enables wireless communication, for example, between the computer 140 and the receiver of the projector 600.

Figure 6:
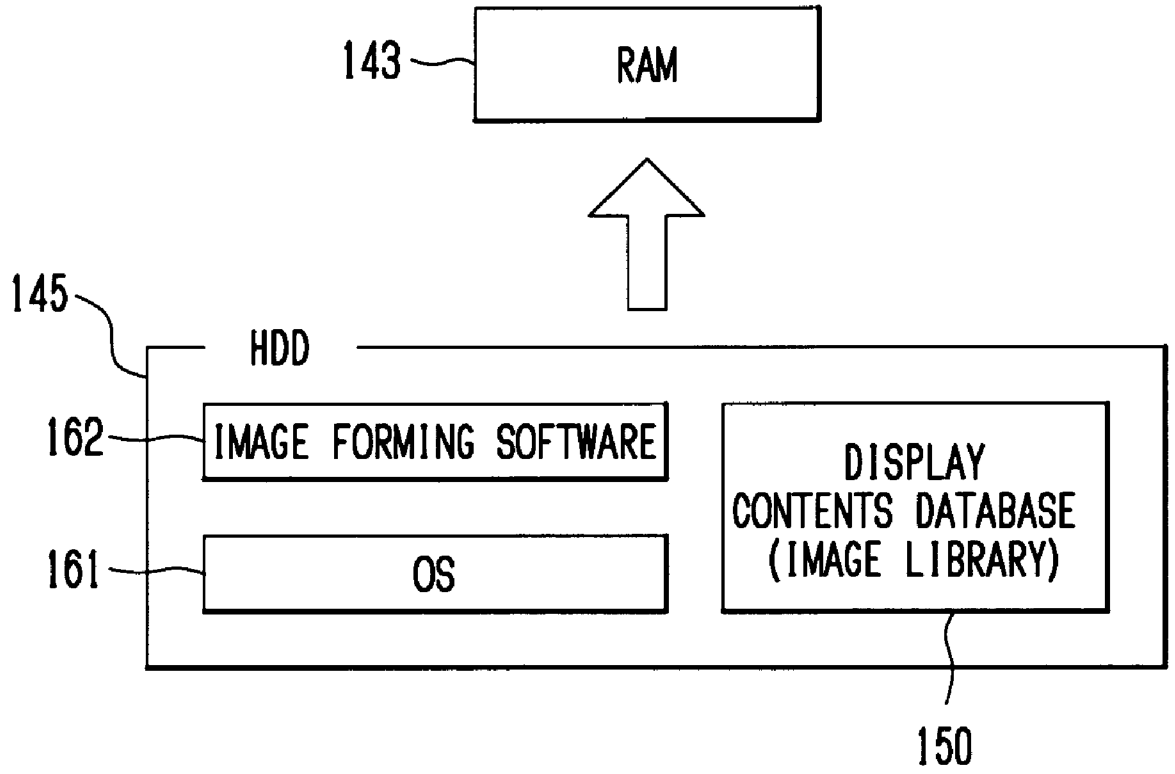
FIG. 6 is an exemplary diagram showing an example of a hardware structure of the controller of the image display controller.

The controller 130, which is the computer 140, is capable of editing and generating the image data of the display image. For such processes, as shown in FIG. 6, an OS 161 and image forming software 162 as application programs are installed in the HDD 145 of the controller 130. In addition, an image contents database 150, which is used with the image forming software 162, is also installed in the HDD 145. On the contrary, a part of the data or all data of the image contents database 150 may be stored in another storage device.

In this embodiment, the display contents database 150 serves as the memory 131. As for the image forming software 162, a slideshow creation program such as Microsoft POWERPOINT®, for example, can be used. It is possible to display the editing background image 300 on the monitor 110, and to edit and generate the image data of the display images on the editing background image 300, by using such image forming software 162. It is also possible to superimpose text on the generated image data, and to set the position of a display image in the display area of the editing background image. Further, it is possible to generate the projector image by combining the generated display image into the editing-background image at the set position. All or a part of the image forming software 162, along with a part of the display contents database 150, is copied into the RAM 143 during a startup process of the image display controller 100 to increase the speed of the process based on the image forming software 162.

The display contents database 150, which serves as an image library, stores various image data and picture data regarding foods, and so on, as model images. When the image forming software 162 edits and generates the image data, the image forming software 162 uses various model images stored in the display contents database 150, and the image forming software 162 is capable of pasting the various model images on an edited or generated display image.

Thus, the controller 130 executes a process for obtaining the editing background image from the memory 131 and displaying the editing background image on the monitor 110, and a process for generating contents of the display images based on a model image stored in the display contents database 150 and the data inputted in the input device 120. Moreover, the controller 130 executes a process for setting a position of the generated display image in a desired position of a display area of the editing background image in response to a instruction inputted via the input device 120, and a process for generating the projector image by combining the generated contents of the display image into the set position of the editing background image. The display contents database 150 stores the model images of the display image and images previously used in display images, which can be accessed by the controller 130 in response to operation in the input device 120. Moreover, the display contents database 150 can store model images of the editing background image, whereby the display contents database 150 serves as the memory 131 for storing the editing background image. The controller 130 (computer 140) sends the image data that has been edited and generated by the image forming software 162, from the data communicator 135 to the projector 600 via the wireless network.

Figure 8:
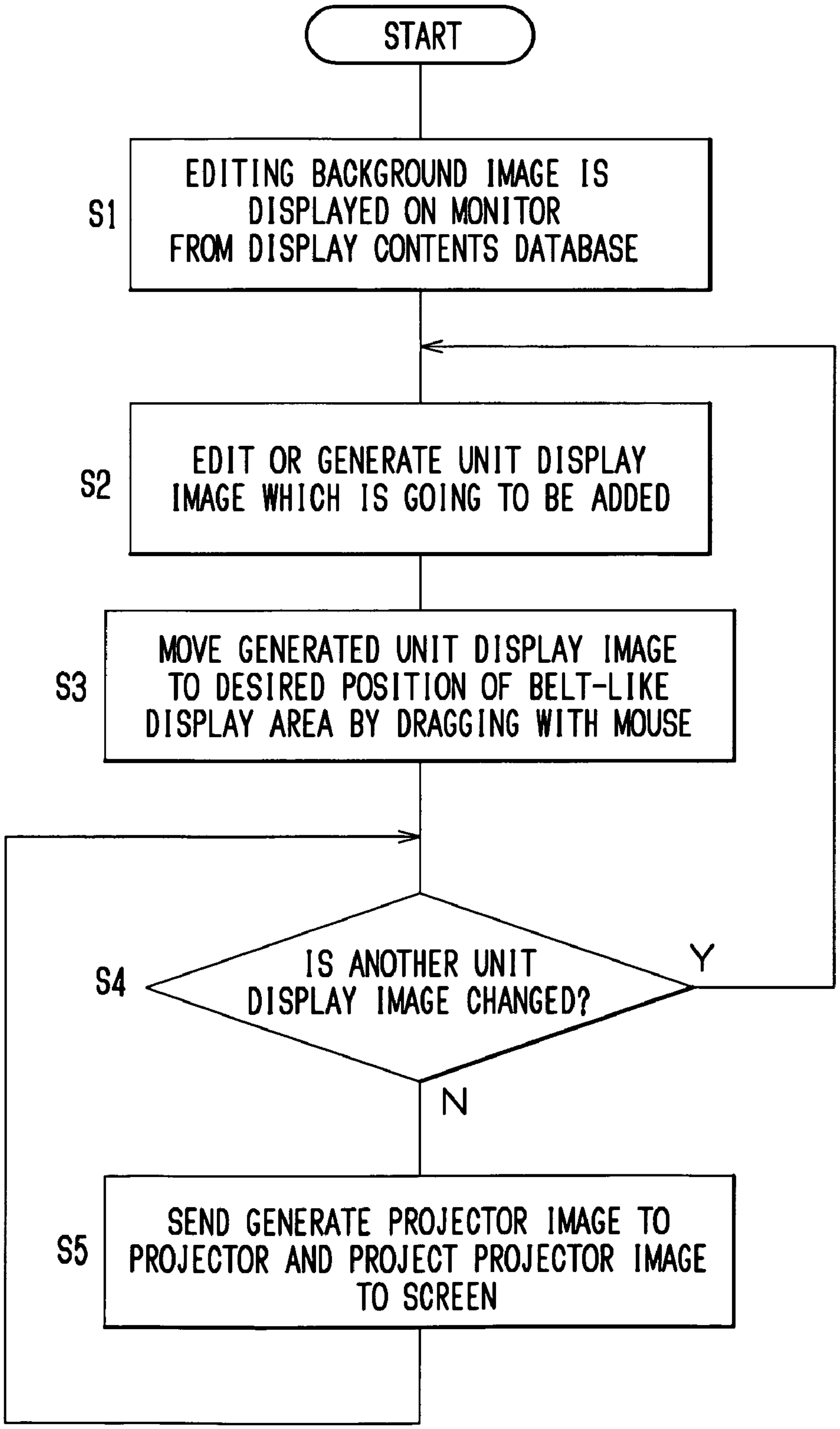
FIG. 8 is a flowchart showing processes for generating the image data of the display image by the image display controller for the display shelf according to an embodiment of the present invention.

FIG. 7 is an exemplary diagram showing a state of generating image data of a display image by the image display controller for the display shelf according to an embodiment of the present invention. A process for generating the display image according to this embodiment of the present invention will be described below with reference to FIG. 8.

First, the image data of the editing background image 300 is obtained from the display contents database 150, which serves the memory 131, and the obtained image data is displayed on the monitor 110 by the image forming software 162 as shown in FIG. 7 (step S1). As noted above, the positions and shapes of each of the belt-like display areas corresponding to the screens of the display shelf 500 are pre-set in the editing background image 300. In this embodiment, the editing background image 300 is a previously-used projector image. Thus, the display images have already been set in the display areas. If the editing background image 300 is a new image (not a previously-used projector image), the outlines of the display areas are displayed in the new editing background image 300, or the color of the display areas is changed, to distinguish the display areas from other areas in the editing background image 300. If the previously-used display image is used as the model image, it is easy to generate the image data of the display image by changing a part of the previously-used display image, for example, by modifying the article name and price.

In this embodiment, the display areas are displayed on the monitor 110 in the descending order 310, 320, 330, 340, and 350. However, the order is changeable. If the order of the display areas are changed, it is necessary to control the display so as to identify which display area corresponds to each screen. The area 360 between the display area 320 and the display area 330 may be blacked out on the monitor 110 because the area 360 does not correspond to a screen.

As shown in FIG. 7, a display image which includes plurality of unit display images is displayed in the belt-like display area 310 corresponding to the screen 523. Specifically, the unit display image 311, which includes the article name "SMALL BLACK SOYBEAN," the article price "¥145," and the article image as a group, is displayed at the left end. The unit display image 312, which includes the article name "TEMPE," the article price "¥270," and the image of the Tempe, is displayed on the right side of the unit display image 311. The unit display image 313, which includes the article name "FERMENTED SOYBEAN," the article price "¥145," and the image of the Fermented Soybean, is displayed on the right side of the unit display image 312. The unit display image 314, which includes the article name "CHOPPED FERMENTED SOYBEAN," the article price "¥150," and the image of the Chopped Fermented Soybean, is displayed on the right side of the unit display image 313. The unit display image 315, which includes the article name "SMALL BLACK SOYBEAN," the article price "¥200," and the image of the Small Black Soybean, is displayed on the right side of the unit display image 314. The unit display image 316, which includes the article name "SMALL BLACK SOYBEAN," the article price "¥250," and the image of the Small Black Soybean, is displayed on the right side of the unit display image 315. The unit display image 317, which includes the article name "SMALL BLACK SOYBEAN," the article price "¥300," and the image of the Small Black Soybean, is displayed on the right side of the unit display image 316. There are lines separating each of the unit display images.

No display image is displayed in the display area 320 corresponding to the screen 533.

A display image displayed in the display area 330 corresponding to the screen 522 includes: the unit display image 331, which includes the text "NOW ON SALE" and the image of vegetables; the unit display image 332, which includes the text "ALL ARTICLES 10% OFF" and the image of fruits; the unit display image 333, which includes the text "NOW ON SALE" and the image of vegetables; and the unit display image 334, which includes the text "ALL ARTICLES 10% OFF" and the image of fruits. There are no lines separating the unit display images in this display area.

The display area 350 corresponding to the screen 521 includes: the unit display image 351, which includes the article name "CHINESE CABBAGE," the article price "¥250/EACH," and the image of the Chinese Cabbage; the unit display image 352, which includes the article name "CORN," the article price "¥100/EACH," and the image of the Corn; the unit display image 353, which includes the article name "CABBAGE," the article price "¥145/EACH," and the image of the Cabbage; the unit display image 354, which includes the article name "CARROT," the article price "¥145/EACH BAG," and the image of the Carrot; and the unit display image 355, which includes the article name "ENOKI MUSHROOM," the article price "¥145/EACH BAG," and the image of the Enoki Mushroom. There are no lines separating the unit display images in this display area.

The process of adding a new unit display image 341 as the display image in the display area 340 corresponding to the screen 532 will be described below. The new unit display image 341 includes a maker of the article "DRINK MAKER" (in actuality, a name of a maker of the drink), the article name "DELICIOUS TEA", a term of selling the article "ONLY 4/1~4/7," the article image, and the price of the article "¥1250."

At first, the image data of the unit display image 341 which is going to be added is edited and generated independently in an arbitrary area of the editing background image 300. That is, the controller 130 accesses the display contents database 150, and executes a search for the desired article information in response to an instruction inputted from the input device 120, and then the image data of the corresponding article is obtained from the display contents database 150 by the image forming software 162. Then, the data, such as the maker of the article and the article name and price is inputted from the keyboard 121 served as the input device 120. The obtained image data and the inputted data are formed into image data by the image forming software 162. That is, the controller 130, executing the image forming software 162, generates the image data of the new unit display image 341 by combining the data inputted from the input device 121 with the image data obtained from the display contents database 150 (step S2). If a suitable unit display image is already stored in the display contents database 150, such an existing unit display image can also be used as the unit display image, or an existing unit display image can be modified to generate the new unit display image. The article image may be newly generated by using the image forming software 162, or an article image generated by the maker of the article may be obtained from the maker via the external network 800. The unit display image which is generated in this manner can be made available for later use by storing it in the display contents database 150. Next, the generated unit display image 341 is moved to the position of the display area 340 of the editing background image 300 corresponding to the desired position in the screen 532 with a drag and drop technique by the pointing device 122, and is located in the desired position (step S3). In this embodiment, the new unit display image 341 is moved and located on the right side of the display area 340. Then, the image data of the display image in which the unit display image 341 is located (on the right side, in this example) is generated. When the new unit display image is changed to the existing unit display image, the existing unit display image displayed on the monitor 110 is deleted, and the new unit display image is located at a position of the existing unit display image instead. Also, the unit display image is capable of being enlarged and reduced by a certain degree, to be fit the height of the unit display image to the height of the belt-like display area.

According to need, the step S2 and S3 may be executed (step S4) again to generate or change other unit display images. If no unit display image is generated or changed ("NO" in the step S4), the controller 130 sets the position of the generated unit display image 341 in the belt-like display area 340. Then, the projector image is generated by combining the generated contents of the display image into the editing background image 300 at the set position. The generated projector image is sent to the projector 600, and displayed on the screens as shown in FIG. 3 (step S5). Then, the set of processes is finished. If the price of article is changed briefly, such as for a limited offer, steps S2~S5 are executed in response to the request for changing the unit display image.

In this embodiment, the display area corresponding to each screen of the display shelf is displayed in the editing background image which is displayed in the monitor, and the generated unit display image can be set in the desired position of the display area. With this structure, it is possible to generate the display image while confirming the state of the display image for each screen of the display shelf. That is, the display image which is displayed in the desired position of the screen of the display shelf can be edited and generated easily, and displayed easily at a desired position.

Figure 9:
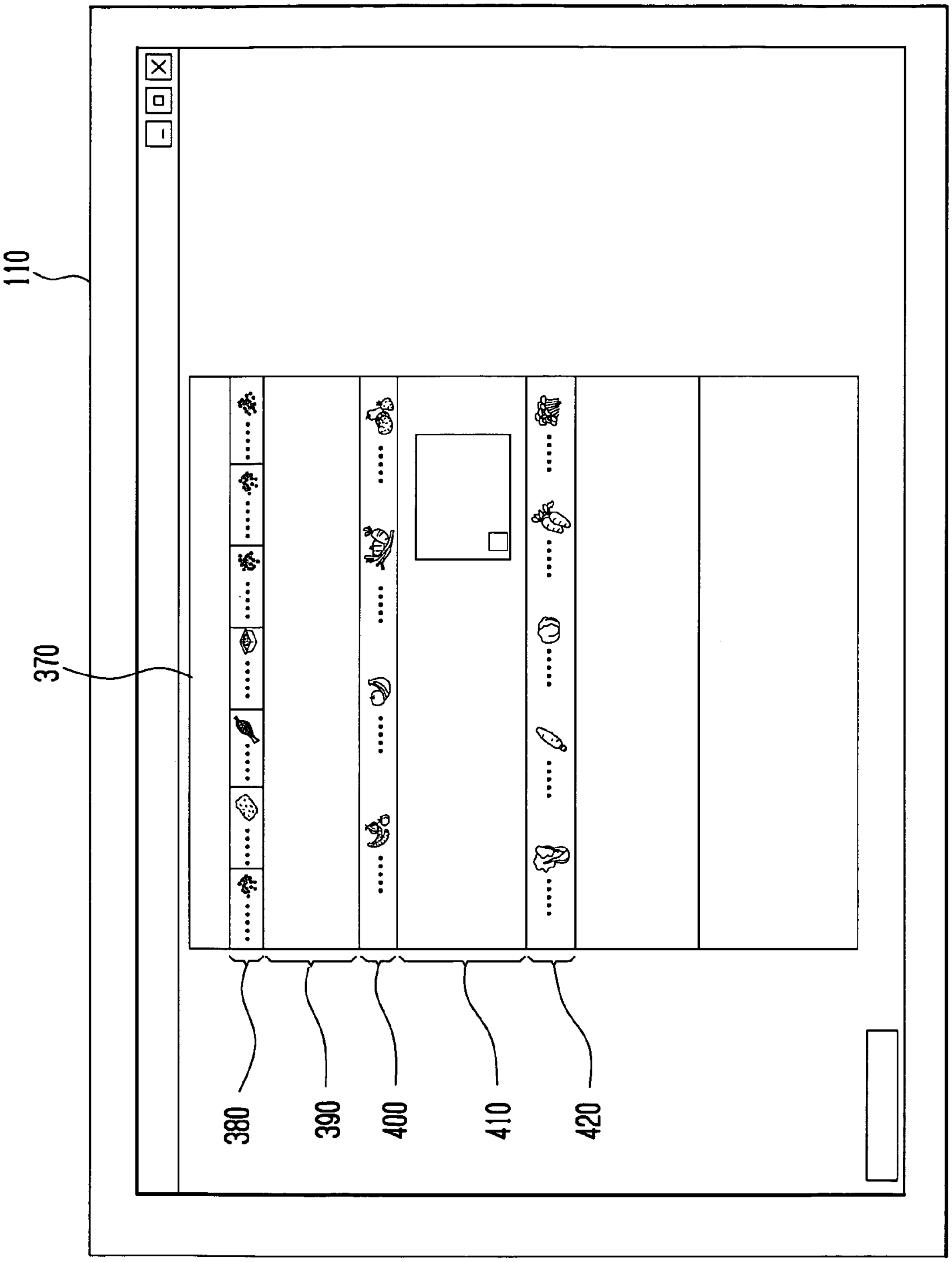
FIG. 9 is an exemplary diagram showing a state of generating the image data of the display image which is generated by the image display controller for the display shelf according to another embodiment of the present invention.

Another embodiment of the present invention with respect to the image display controller for the display shelf will be described below with reference to FIG. 9. The structure of the image display controller 100, and the process for generating the display image according to this embodiment is the same as described above with reference to FIGS. 1-8. In this embodiment, however, the front view of the display shelf 500, in which other portions of the front of the display shelf 500 are visible in addition to the screens 521, 522, 523, 532, and 533, is used as the editing background image 370 displayed on the monitor 110. The image data of the editing background image 370 is stored in the display contents database 150 serving as the memory 131 for storing the editing background image. The belt-like display areas 380, 390, 400, 410 and 420 corresponding respectively to the screens 523, 533, 522, 532, and 521 of the display shelf, as well as the display images located in each display area, are displayed in the editing background image 370 which is the front view of the display shelf 500.

In this embodiment, it is possible to confirm the display of the display images on the actual screen of the display shelf by displaying an image which is the front view of the display shelf as the editing background image displayed in the monitor. As a result, it is possible to generate and locate the display image while confirming the display effect in detail.

Figure 10:
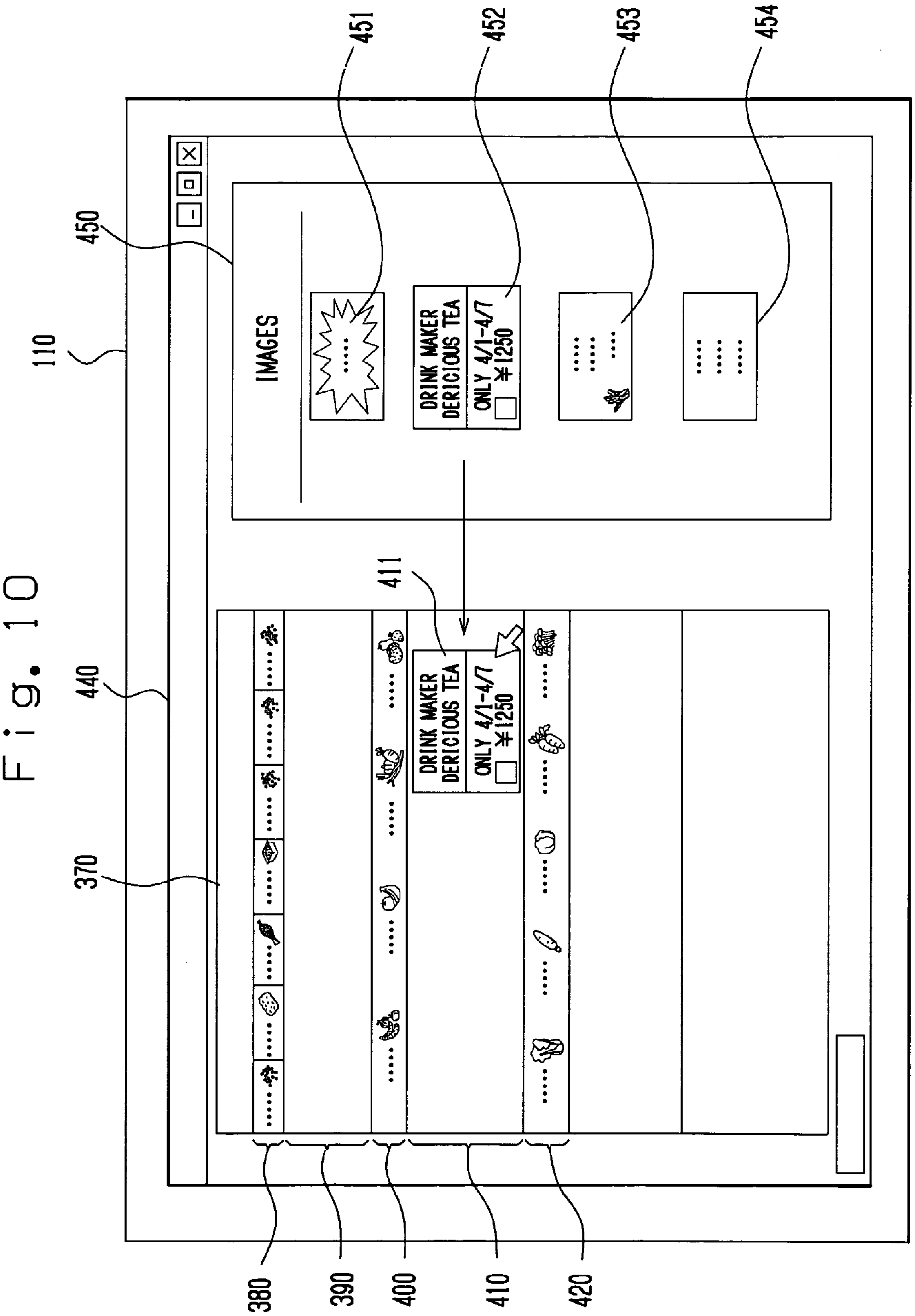
FIG. 10 is an exemplary diagram showing a state of generating the image data of the display image which is generated by the image display controller for the display shelf according to still another embodiment of the present invention.

Still another embodiment of the present invention with respect to the image display controller for the display shelf will be described below with reference to FIG. 10. The structure of the image display controller 100 according to this embodiment is the same as described above with reference to FIGS. 1-8. In this embodiment, as in the embodiment described above with respect to FIG. 9, the editing background image 370 which is the front view of the display shelf 500 is displayed in the area 440 of the monitor 110. In addition, a plurality of images 451-454 which are selectable for adding or changing unit display image, and a selecting image display area 450 from which the plurality of images 451-454 can be selected, can be displayed on the monitor. The selecting image display area 450 is fixed and located on a part of the monitor. These images 451-454 are selected and taken from the display contents database 150 or the external network 800. It is possible to select a particular image from the images displayed in the selecting image display area 450, to move the image to a desired position in one of the display areas 380, 390, 400, 410, 420 of the editing background image 370 by the pointing device 122, and to edit the image via the input device 120. Thus, a new unit display image 411 can be added into the editing background image 370.

In this embodiment, it is possible to edit and generate the unit display image more easily, and locate the unit display image more easily in the editing background image.

Figure 11:
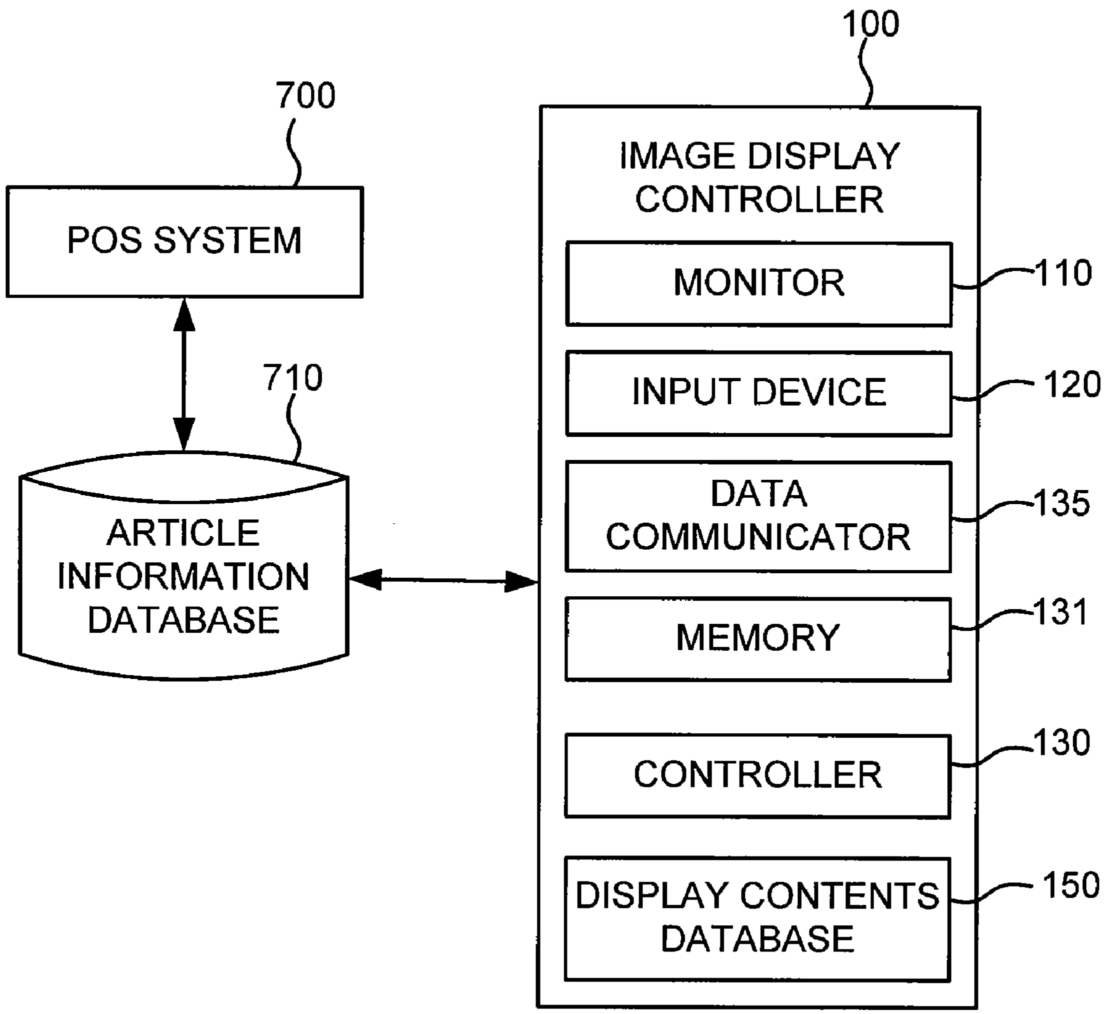
FIG. 11 is a block diagram showing a structure of the image display controller for the display shelf according to still another embodiment of the present invention.

A further embodiment of the present invention with respect to the image display controller for the display shelf will be described below with reference to FIG. 11. In this embodiment, the image display controller 100 is connected to an article information database 710 of a POS system 700. The structure of the image display controller 100 is the same as described above (see, for example, FIG. 4).

The article information database 710 stores the article information about all articles displayed in a store, including the article name, and the price, including discount information, in accordance with an article code, and so on. The article information database 710 is always updated with the latest information for changing the price and adding new articles by the POS system 700. When a unit display image which includes the article information is generated and the article information is changed, it is necessary to reflect the changed article information to the unit display image. Thus, by inputting the article code of the desired article, the controller 130 accesses the article information database 710, and searches for the desired article information. Then, the controller 130 generates the unit display image which includes the latest article information by combining the model image retrieved from the display contents database 150 with image information based on the article information retrieved from the article information database 710.

In this embodiment, the display image is always generated based on the latest article information, thus, it is possible to generate an up-to-date display image.

Obviously, numerous modifications and variations of the present invention are possible in light of the above teachings. For example, in the embodiments described above, the image data of the projector image, which is generated by the image display controller 100, is sent to the projector 600 wirelessly. It is also possible to use a wired network instead of the wireless network. As an alternative, the generated image data of the projector image can be stored in a recording medium, such as a CD or a USB memory, and the image data can be transferred to the projector 600 using the recording medium. Multiple projector images may be transferred to projectors in multiple display shelves in this manner, or via a wireless network. It is therefore to be understood that within the scope of the appended claims, the invention may be practiced otherwise than as specifically described herein.

What is claimed is:

1. An image display controller comprising:

a monitor for displaying information;

an input device for inputting information;

a data communicator for communicating with a projector arranged in a display shelf, the display shelf comprising:

a placing table adapted to have an article placed thereon, a transmission-type screen arranged adjacent to the placing table for displaying a projector image projected onto a rear side thereof by the projector, and a projector placing portion for supporting the projector at a position from which the projector projects the projector image to the rear side of the transmission-type screen;

a memory for storing an editable background image comprising an area associated with the transmission-type screen; and a controller which (i) obtains the editable background image from the memory, and displays the editable background image on the monitor so that the editable background image becomes editable, (ii) generates a display image for a portion of the editable background image, (iii) sets a position of the display image to a position of the portion of the editable background image designated by an instruction inputted via the input device, and (iv) generates the projector image by combining the display image into the editable background image at the position designated by the instruction, wherein the display image comprises a plurality of display images for a plurality of portions of the editable background image, respectively, the display images are generated independently of the editable background image, and positions of the display images are set at positions of the portions of the editable background image designated by the instruction, respectively.

2. An image display controller according to claim 1, wherein the display shelf includes a plurality of transmission-type screens, and wherein the editable background image comprises a plurality of areas associated with the transmission type screens, respectively.

3. An image display controller according to claim 1, wherein the editable background image stored in the memory is an image of a front view of the display shelf.

4. An image display controller according to claim 1, wherein the controller accesses an article information database which includes article information concerning a plurality of articles, retrieves desired article information from the article information database, and generates the display image based on the article information retrieved from the article information database.

5. An image display controller according to claim 4, wherein the controller accesses a display contents database which stores model images of the articles, retrieves a desired one of the model images from the display contents database, and generates the display image by combining the retrieved model image with image information based on the article information retrieved from the article information database.

* * * * *